United States Patent
Blaschka et al.

(10) Patent No.: US 6,784,286 B2
(45) Date of Patent: Aug. 31, 2004

(54) TRANSPARENT GREENISH YELLOW PYRAZOLONE PIGMENTS

(75) Inventors: Peter Blaschka, Ludwigshafen (DE); Günter Smeyts, Meckenheim (DE); Paul Günthert, Schifferstadt (DE)

(73) Assignee: BASF Aktiengesellschaft, Ludwigshafen ( * ) Notice: Subject to any disclaimer, the term of this patent is extended or adjusted under 35 U.S.C. 154(b) by 0 days.

(21) Appl. No.: 10/433,487

(22) PCT Filed: Dec. 11, 2001

(86) PCT No.: PCT/EP01/14510
§ 371 (c)(1),
(2), (4) Date: Jun. 13, 2003

(87) PCT Pub. No.: WO02/48266
PCT Pub. Date: Jun. 20, 2002

(65) Prior Publication Data
US 2004/0039183 A1 Feb. 26, 2004

(30) Foreign Application Priority Data
Dec. 13, 2000 (DE) .......................... 100 62 130

(51) Int. Cl.⁷ .................. C09B 67/20; C09B 29/46; D06P 5/08
(52) U.S. Cl. .................. 534/575; 534/588; 534/602; 534/712; 534/784; 106/496; 524/106
(58) Field of Search .................. 534/575, 588, 534/602, 712, 784; 106/496; 524/106

(56) References Cited

U.S. PATENT DOCUMENTS 4,980,458 A * 12/1990 Hari et al. .................. 534/575

FOREIGN PATENT DOCUMENTS

| DE | 26 16 981 | 10/1977 |
|---|---|---|
| EP | 0 073 972 | 3/1983 |
| EP | 0 126 405 | 11/1984 |
| EP | 0 263 074 | 4/1988 |
| EP | 0 397 190 | 11/1990 |
| EP | 0 553 965 | 8/1993 |
| WO | 96 22333 | 7/1996 |

* cited by examiner

*Primary Examiner*—Fiona T. Powers
(74) *Attorney, Agent, or Firm*—Oblon, Spivak, McClelland, Maier & Neustadt, P.C.

(57) ABSTRACT

The invention relates to pyrazolone pigments of general formula (I), wherein the radicals $R^1$, $R^2$, $R^3$ and $R^4$ independently represent hydrogen, chlorine, methyl or ethyl, whereby at least one of the radicals $R^1$–$R^4$ is different from hydrogen. The inventive pigments are characterised by a CIELAB colour angle of 80–85°, a chroma of 58–62 and a luminosity $\geq 87$ (measuring angle 45°, standard illuminant D65).

(I)

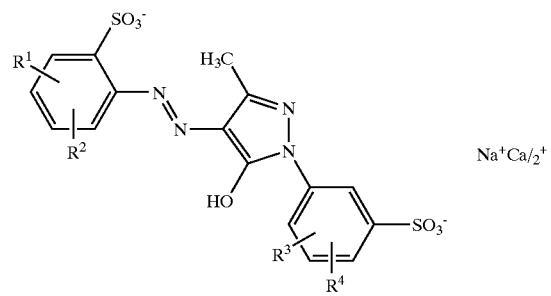

14 Claims, No Drawings

TRANSPARENT GREENISH YELLOW PYRAZOLONE PIGMENTS

BACKGROUND OF THE INVENTION

Field of the Invention

The present invention relates to novel pyrazoloneazo pigments of the general formula I

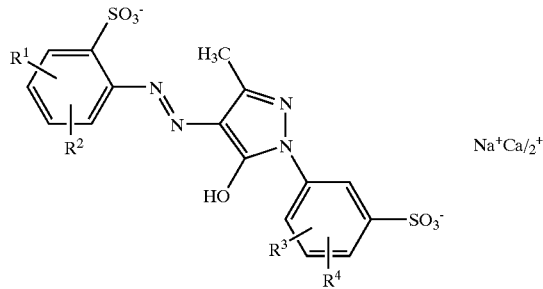

where $R^1$, $R^2$, $R^3$ and $R^4$ are independently hydrogen, chlorine, methyl or ethyl subject to the proviso that at least one of $R^1$ to $R^4$ is not hydrogen,
characterized by a CIELAB hue angle of from 80 to 85°, a chroma of from 58 to 62 and a lightness of 087 (45° measuring angle, D65 illuminant).

DESCRIPTION OF THE BACKGROUND

The invention further relates to the preparation of these pigments and to their use for coloring macromolecular organic materials and also to macromolecular organic materials colored with these pigments.

Pyrazoloneazo pigments are used as yellow pigments for coloring plastics, as will be known. EP-A-263 074 discloses mixed crystals of laked azo dyes of the pyrazolone series that contain two different laking cations. True, mixed Ca-Na crystals are described, but these pigments have an orange hue and the color strength and transparency of their colorations lack conviction.

SUMMARY OF THE INVENTION

It is an object of the present invention to provide pyrazoloneazo pigments for the greenish yellow hue sector which are notable for altogether advantageous application properties, including especially the color strength and transparency of their colorations.

DETAILED DESCRIPTION OF THE PREFERRED EMBODIMENTS

We have found that this object is achieved by the pyrazoloneazo pigments I defined at the beginning.

The present invention further provides a process for preparing these pyrazoloneazo pigments I, which comprises diazotizing a 2-aminobenzenesulfonic acid of the general formula II

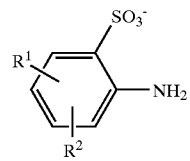

in an aqueous medium with sodium nitrite, coupling the resulting diazo component in an aqueous medium with a 1-(3'-sulfophenyl)-3-methyl-5-pyrazolone of the general formula III

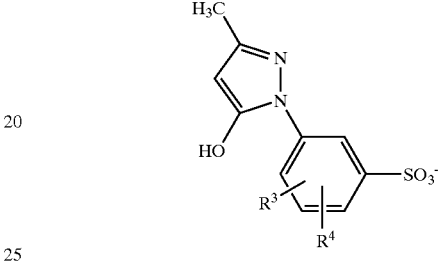

and then reacting the coupling product with an aqueous solution of a calcium salt in the presence of an anionic surfactant to form a mixed sodium-calcium salt and then isolating the latter in a conventional manner.

The present invention further provides for the use of the pyrazoloneazo pigments I for coloring macromolecular organic materials.

$R^1$ to $R^4$ in the formula I are independently hydrogen, chlorine, methyl or ethyl subject to the proviso that at least one of $R^1$ to $R^4$ is not hydrogen. Preferably $R^1$ and $R^2$ are not hydrogen and particularly preferably $R^1$ and $R^2$ are each chlorine and $R^3$ and $R^4$ are each hydrogen.

The pyrazoloneazo pigments I according to the invention have a greenish yellow hue (CIELAB hue angle from 80 to 85°) having excellent cleanness (Chroma 58 to 62). They have a high color strength and are notable for the transparency of their colorations in macromolecular organic materials. They are present in the form of acicular crystals (length about 0.8–2.5 µm, thickness about 0.1–0.2 µm), which are convenient to incorporate into application media.

The pyrazoloneazo pigments I are advantageously preparable by the process of the invention, which in the presence of water as reaction medium is preferably carried out as a one-pot reaction without isolation of intermediates.

The first step of the process according to the invention is the diazotization of 2-aminobenzenesulfonic acid II with sodium nitrite.

It is customary to use from 1 to 1.1 mol of sodium nitrite per mole of 2-aminobenzenesulfonic acid II.

The diazotization is customarily carried out at a pH in the range from 0.5 to 0.8, which is set by addition of an aqueous acid, especially a mineral acid such as hydrochloric acid, and at from 0 to 5° C.

The second step of the process according to the invention is the coupling of the resulting diazo component with the 1-(3'-sulfophenyl)-3-methyl-5-pyrazolone III (coupling component) in an aqueous medium.

This is customarily done in the presence of a buffer, for example sodium acetate, which is used to set a pH in the range from 4.8 to 5.1.

The reaction temperature is generally in the range from 15 to 20° C.

The molar ratio of diazo component to coupling component III is generally in the range from 0.9:1 to 1:1.

The third step of the process according to the invention, the laking to form the mixed sodium-calcium salt, is carried out directly in the as-coupled reaction mixture in the presence of an anionic surfactant.

Useful surfactants include not only carboxylates, sulfates, phosphonates and phosphates but especially sulfonates, in particular alkanesulfonates, i.e., salts of alkanesulfonic acids. These are the sulfochlorination or sulfoxidation products of straight-chain paraffins, i.e., mixtures of homologous alkanes having from 12 to 18 carbon atoms.

It is customary to use from 100 to 180 g, preferably from 140 to 160 g, of surfactant per mole of coupling component III.

The laking is preferably carried out at from 75 to 85° C., especially at about 80° C.

Useful laking agents include in principle all water-soluble calcium salts. Examples are calcium chloride and calcium acetate, of which calcium chloride is preferred.

The laking product is then preferably subjected to a thermal treatment at from 90 to 95° C. for the ultimate finishing of the particles.

The preparation process of the invention is conveniently carried out as follows:

The diazotizing step is carried out by dissolving the 2-aminobenzenesulfonic acid II in an alkaline aqueous medium, adding an acid to set a strongly acidic pH, adding ice to cool to about 0–5° C. and then adding a sodium nitrite solution. Following a subsequent stirring time of about 1–2 h at this temperature, any excess nitrite still present is destroyed with amidosulfonic acid.

The coupling step is carried out by preparing an aqueous solution of the coupling component 1-(3'-sulfophenyl)-3-methyl-5-pyrazolone III by adding a buffer and then cooling to about 10–15° C. by adding an ice-water mixture. The reaction mixture obtained in the diazotization is then added with rapid stirring and the temperature of the mixture is maintained at 15–20° C.

After the coupling reaction has ended, the anionic surfactant is added, the mixture is heated to 75–85° C. over about 0.5–1.5 h and then the laking agent is added over about 10–30 min with rapid stirring.

To finish the pigment particles, the reaction mixture is then heated to 90–95° C. over about 10–30 min and subsequently stirred at that temperature for about 1–3 h.

The mixed sodium-calcium salt may be isolated in a conventional manner after cooling to about 60–65° C. by addition of an ice-water mixture, filtration, washing with hot water and drying.

The pyrazoloneazo pigments I according to the invention are very useful for coloring macromolecular organic materials, for example cellulose ethers and esters such as ethylcellulose, nitrocellulose, cellulose acetate and cellulose butyrate, natural resins and synthetic resins such as addition polymerization resins and condensation resins such as aminoplasts, especially urea- and melamine-formaldehyde resins, alkyd resins, phenolic resins, polycarbonates, polyolefins, polystyrene, polyvinyl chloride, polyamides, polyurethanes, polyesters, acrylonitrile-butadiene-styrene rubbers, polyphenylene oxides, natural rubber, casein, silicone and silicone resins.

When used for this purpose, the pyrazoloneazo pigments I are notable for their greenish yellow hue, the cleanness of their hue and their color strength and also the transparency of their coloration, which are each substantially above the values obtained with the mixed crystals of EP-A-263 074.

EXAMPLE

Preparation of Pyrazoloneazo Pigment Ia According to the Invention ($R^1=R^2=Cl$; $R^3=R^4=H$)

To a mixture of 200 ml of water and 6 ml of 50% by weight aqueous sodium hydroxide solution were added 24.2 g of 2-amino-4,5-dichlorobenzenesulfonic acid (reckoned 100%). The mixture was subsequently stirred for 15 minutes before 61 ml of 18.6% by weight hydrochloric acid were added to set a pH<1. The solution was cooled with 140 g of ice to about 0° C. before a solution of 7.1 g of sodium nitrite in 25 ml of water was added. After subsequent stirring at 2–5° C. for one hour excess nitrite was destroyed with amidosulfonic acid.

Separately, 26 g of 1-(3'-sulfophenyl)-3-methyl-5-pyrazolone were added to 290 ml of water and dissolved by addition of 30.5 g of sodium acetate. An ice-water mixture was added to set a temperature of 15° C. and a volume of 520 ml. The diazotization mixture was then added with rapid stirring. The mixture was stirred at 15° C. for a further 30 min.

After 15 g of the sodium salt of a sulfochlorinated $C_{14}C_{17}$ paraffin had been added as a surfactant, the reaction mixture was heated to 80° C. over 1 h. Then 33.5 ml of a 34% by weight aqueous solution of calcium chloride were added over 10 min with rapid stirring. The mixture was heated to 90° C. over 15 min and subsequently stirred at 90° C. for 2 h.

The reaction mixture was cooled down to about 60° C. by addition of an ice-water mixture before the reaction product was filtered off and washed with water until the runoff had a conductivity of about 200 $\mu$S. The product was subsequently dried at 80° C. under reduced pressure.

This provided 49.8 g of the pyrazolonaezo pigment Ia in the form of the dihydrate, which corresponds to a yield of 90.8%, based on 2-amino-4,5-dichlorobenzenesulfonic acid.

Analysis (% by weight calculated/found): Na: 4.2/3.8; Ca: 3.6/3.5.

To determine the CIELAB values, obtained pigment Ia was incorporated into plasticized PVC by homogenizing a mixture of 0.4 g of pigment Ia, 4.0 g of titanium dioxide and 80 g of a mixture of 65 parts of polyvinyl chloride powder, 35 parts of diethylhexyl phthalate and 2 parts of dibutyltin hexyl bisthioglycolate using a two-roll mill at 160° C. for about 5 min. The mixed stock was subsequently rolled out to a sheet and pressed.

The resultant smooth milled sheet was photometrically measured and evaluated according to the CIELAB formula (DIN 6174). The following chromaticity coordinates were obtained: hue angle 84°, chroma 61, cleanness 87. Pigment Ia had a substantially superior color strength over the pigments described in EP-A-263 074.

The transparency of obtained pigment Ia was likewise determined in plasticized PVC. A milled sheet 1 mm in thickness was produced as described for the determination of the CIELAB values. It contained 0.3 g of pigment Ia and 50 g of the mixture of polyvinyl chloride, diethylhexyl phthalate and dibutyltin hexyl bisthioglycolate.

The difference in the light reflection of the colored milled sheet against a black and white background was measured as contrast delta-E value (DIN 6174 color difference from Idealblack). The larger the difference and hence also the contrast delta-E value, the less the background is hidden and the higher the transparency of the coloration. The contrast delta-E value obtained for pigment Ia was 51.9. A plasticized PVC coloration for comparison with the pigment of Example 2 of EP-A-263 074 produced only a contrast delta-E value of 20.6.

Finally, pigment Ia was also found to be thermally stable in HDPE at 300° C. (DIN 53 772).

We claim:

1. A pyrazoloneazo pigment of formula I $$\text{(I)}$$

wherein $R^1$, $R^2$, $R^3$ and $R^4$ are independently hydrogen, chlorine, methyl or ethyl, with the proviso that at least one of $R^1$ to $R^4$ is not hydrogen, and having a CIELAB hue angle of from 80 to 85°, a chroma of from 58 to 62 and a lightness of $\geq 87$ (45° measuring angle, D65 illuminant) and which has the form of thin acicular crystals having a needle length of from 0.8 to 2.5 µm and a needle thickness of from 0.1 to 0.2 µm.

2. The pyrazoloneazo pigmet of formula I as claimed in claim 1, wherein $R^1$ and $R^2$ are each chlorine and $R^3$ and $R^4$ are each hydrogen.

3. A process for preparing the pyrazoloneazo pigment of the formula as claimed in claim 1 comprising:

diazotizing a 2-axninobenzenesulfonic acid of formula II $$\text{(II)}$$

in an aqueous medium with sodium nitrite;

coupling the resulting diazo component in an aqueous medium with a 1-(3'-sulfophenyl)-3-methyl-5-pyrazolone of formula III $$\text{III}$$

and then reacting the coupling product with an aqueous solution of a calcium salt in the presence of an anionic surfactant to form a mixed sodium-calcium salt and then isolating the mixed sodium-calcium salt.

4. The process as claimed in claim 3, wherein the surfactant is an alkanesulfonate.

5. The process as claimed in claim 3, wherein the reaction with the calcium salt is conducted at a temperature ranging from 75 to 85° C.

6. The process as claimed in claim 3, wherein the mixed sodium-calcium salt is thermally treated at a temperature ranging from 90 to 95° C. before being isolated.

7. Macromolecular organic materials colored with the pyrazoloneazo pigments of formula I as claimed in claim 1.

8. A process for preparing the pyrozoloneazo pigment of formula I as claimed in claim 2, comprising diazotizing a 2-aminobenzenesulfonic acid of formula II $$\text{(II)}$$

in an aqueous medium with sodium nitrite;

coupling the resulting diazo component in an aqueous medium with a 1-(3'sulfophenyl)-3-methyl-5-pyrazolone of formula III $$\text{III}$$

and then reacting the coupling product with an aqueous solution of a calcium salt in the presence of an anionic surfactant to form a mixed sodium-calcium salt and then isolating the mixed sodium-calcium salt.

9. The process as claimed in claim 4, wherein the reaction with the calcium salt is conducted at a temperature ranging from 75 to 85° C.

10. The process as claimed in claim 4, wherein the mixed sodium-calcium salt is thermally treated at a temperature ranging from 90 to 95° C. before being isolated.

11. The process as claimed in claim 5, wherein the mixed sodium-calcium salt is thermally treated at a temperature ranging from 90 to 95° C. before being isolated.

12. Macromolecular organic materials colored with the pyrazoloneazo pigment of formula I as claimed in claim 2.

13. A method of coloring a macromolecular organic material, comprising:

blending the macromolecular organic material with the pyrazoloneazo pigment of formula (I) as claimed in claim 1.

14. A method of coloring a macromolecular organic material, comprising:

blending the macromolecular organic material with the pyrazoloneazo pigment of formula (I) as claimed in claim 2.

* * * * *